US011677258B2

(12) United States Patent
Ehlert et al.

(10) Patent No.: US 11,677,258 B2
(45) Date of Patent: Jun. 13, 2023

(54) HIGH VOLTAGE WINCH SYSTEM LEVERAGING HYBRID ELECTRIC VEHICLE ARCHITECTURE

(71) Applicant: FORD GLOBAL TECHNOLOGIES, LLC, Dearborn, MI (US)

(72) Inventors: Michael Ehlert, Livonia, MI (US); Joseph Confer, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1172 days.

(21) Appl. No.: 16/260,440

(22) Filed: Jan. 29, 2019

(65) Prior Publication Data

US 2020/0244091 A1 Jul. 30, 2020

(51) Int. Cl.
*B66D 1/12* (2006.01)
*B60K 20/00* (2006.01)
*H02J 7/14* (2006.01)
*B66D 3/26* (2006.01)
*B66D 1/40* (2006.01)
*B60K 25/00* (2006.01)

(52) U.S. Cl.
CPC .............. *H02J 7/1446* (2013.01); *B66D 1/12* (2013.01); *B66D 1/40* (2013.01); *B66D 3/26* (2013.01); *B60K 2025/005* (2013.01)

(58) Field of Classification Search
CPC .......... H02J 7/1446; B66D 1/00; B66D 1/12; B66D 1/28; B66D 1/40; B66D 3/26; B60K 2025/005; B60G 17/018; B60G 17/0195; B60G 2600/73; B63B 2021/505
See application file for complete search history.

(56) References Cited

U.S. PATENT DOCUMENTS

| | | | | |
|---|---|---|---|---|
| 4,732,286 A * | 3/1988 | Koenig | ................... | B66C 23/90 340/685 |
| 5,522,582 A * | 6/1996 | Dilks | ....................... | B66D 1/40 254/323 |
| 5,692,735 A * | 12/1997 | Aho | ......................... | B66D 1/08 254/323 |
| 5,842,684 A * | 12/1998 | Aho | ......................... | B66D 1/08 254/323 |
| 8,006,958 B2 * | 8/2011 | Starks | ...................... | B66D 3/20 254/323 |
| 8,958,956 B1 * | 2/2015 | Felps | ....................... | B66D 1/12 254/362 |
| 10,392,235 B2 * | 8/2019 | Fretz | ....................... | B66D 1/28 |
| 10,532,917 B2 * | 1/2020 | Hall | ......................... | B66D 1/14 |
| 2008/0099738 A1 * | 5/2008 | Burns | ..................... | B66D 1/12 254/323 |

(Continued)

FOREIGN PATENT DOCUMENTS

GB 2362366 A * 11/2001 ............... B66D 1/12
JP 2009165616 A * 7/2009

*Primary Examiner* — Michael E Gallion
(74) *Attorney, Agent, or Firm* — David Kelley; Brooks Kushman, P.C.

(57) ABSTRACT

A vehicle includes an auxiliary battery configured to power an electrical accessory, a traction battery configured to provide power to propel the vehicle, a winch including a motor and cable, and a controller configured to, responsive to a requested torque of the motor being less than a threshold, initiate transfer of power to the motor from the auxiliary battery, and initiate transfer of power to the motor from the traction battery otherwise.

14 Claims, 3 Drawing Sheets

(56) References Cited

U.S. PATENT DOCUMENTS

| | | | |
|---|---|---|---|
| 2008/0224110 A1* | 9/2008 | Starks | B66D 3/20 254/264 |
| 2013/0048929 A1* | 2/2013 | Starks | B66D 3/20 254/362 |
| 2015/0191334 A1* | 7/2015 | Heravi | G08C 17/02 254/323 |
| 2015/0307332 A1* | 10/2015 | Huang | B66D 1/12 254/323 |
| 2016/0114862 A1* | 4/2016 | Janik | B66D 1/505 254/362 |
| 2016/0121823 A1* | 5/2016 | Umscheid | B60W 10/12 701/2 |
| 2016/0159625 A1* | 6/2016 | Janik | B66D 1/485 700/282 |
| 2018/0127246 A1* | 5/2018 | Fretz | B66D 1/12 |
| 2018/0154773 A1 | 6/2018 | Dalum | |

* cited by examiner

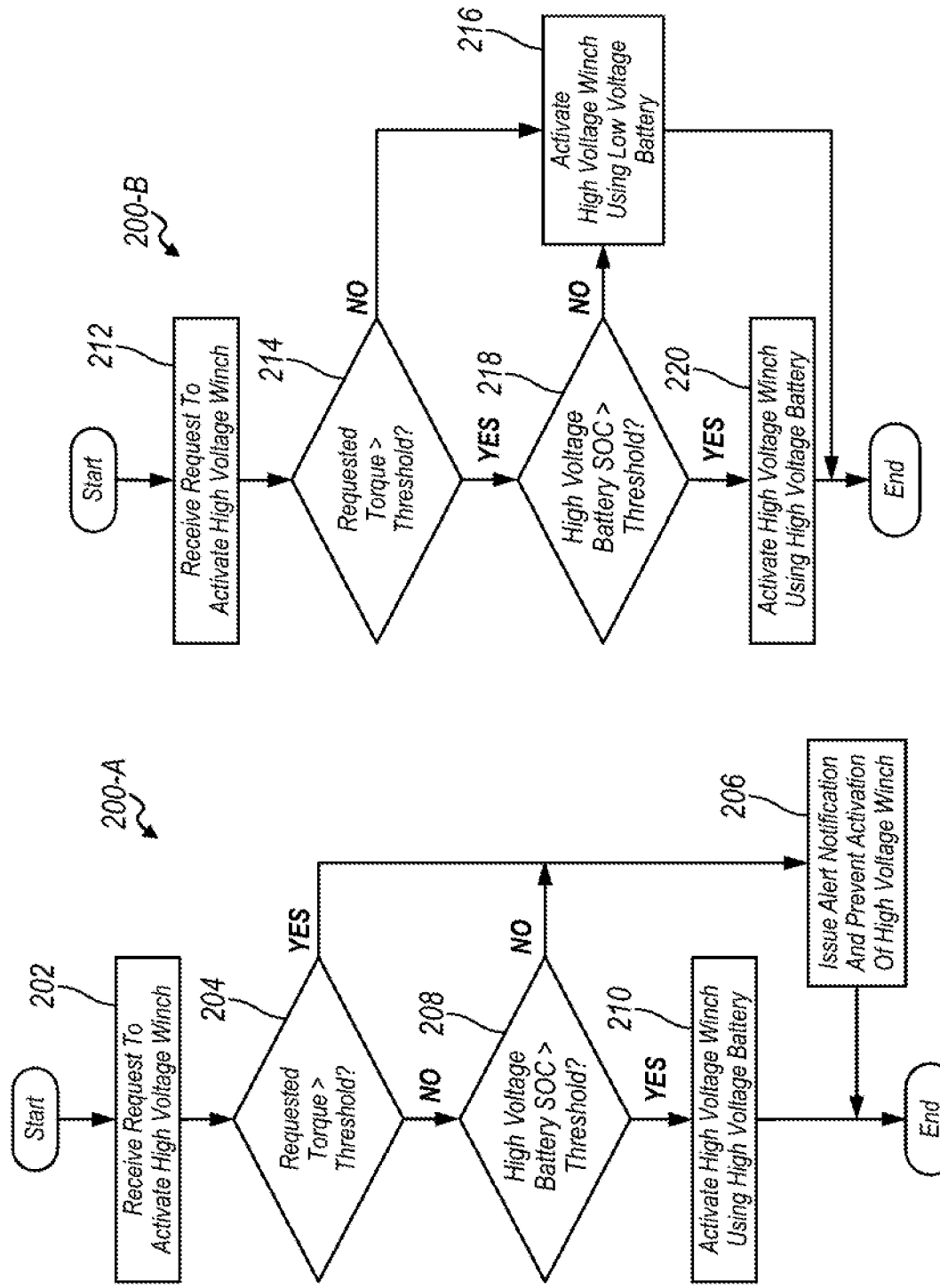

HIGH VOLTAGE WINCH SYSTEM LEVERAGING HYBRID ELECTRIC VEHICLE ARCHITECTURE

TECHNICAL FIELD

The present disclosure relates to systems and methods for operating a winch system using high voltage electrical architecture of a hybrid electric vehicle (HEV).

BACKGROUND

The term "hybrid vehicle" may be used to describe vehicles having one or more sources of propulsion power, such as an internal combustion engine and an electric motor. Examples of hybrid vehicles include HEV and plug-in hybrid electric vehicles (PHEV). An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A vehicle includes an auxiliary battery that powers an electrical accessory, a traction battery that provides power to propel the vehicle, a winch including a motor and cable, and a controller. The controller, responsive to a requested torque of the motor being less than a threshold, initiates transfer of power to the motor from the auxiliary battery, and initiates transfer of power to the motor from the traction battery otherwise.

A system for a vehicle includes a winch including a motor and cable, a traction battery, and a controller. The controller, in response to a requested torque for the motor being less than a first threshold, initiates transfer of power from the traction battery to the motor to provide the requested torque, and in response to efficiency of the motor falling below an efficiency threshold, operates a suspension of the vehicle to change height of the vehicle with respect to ground during the transfer of power.

A method for a vehicle includes initiating, by a controller, transfer of power from a traction battery to a motor of a winch to deliver a requested motor torque responsive to the requested torque being less than a first threshold, and operating a suspension of the vehicle to change height of the vehicle with respect to ground during the transfer of power responsive to efficiency of the motor fining below an efficiency threshold.

BRIEF DESCRIPTION OF THE DRAWINGS

FIGS. 2A-2B are flowcharts illustrating algorithms for operating the winch using electrical architecture of the HEV.

DETAILED DESCRIPTION

Figure 1A:
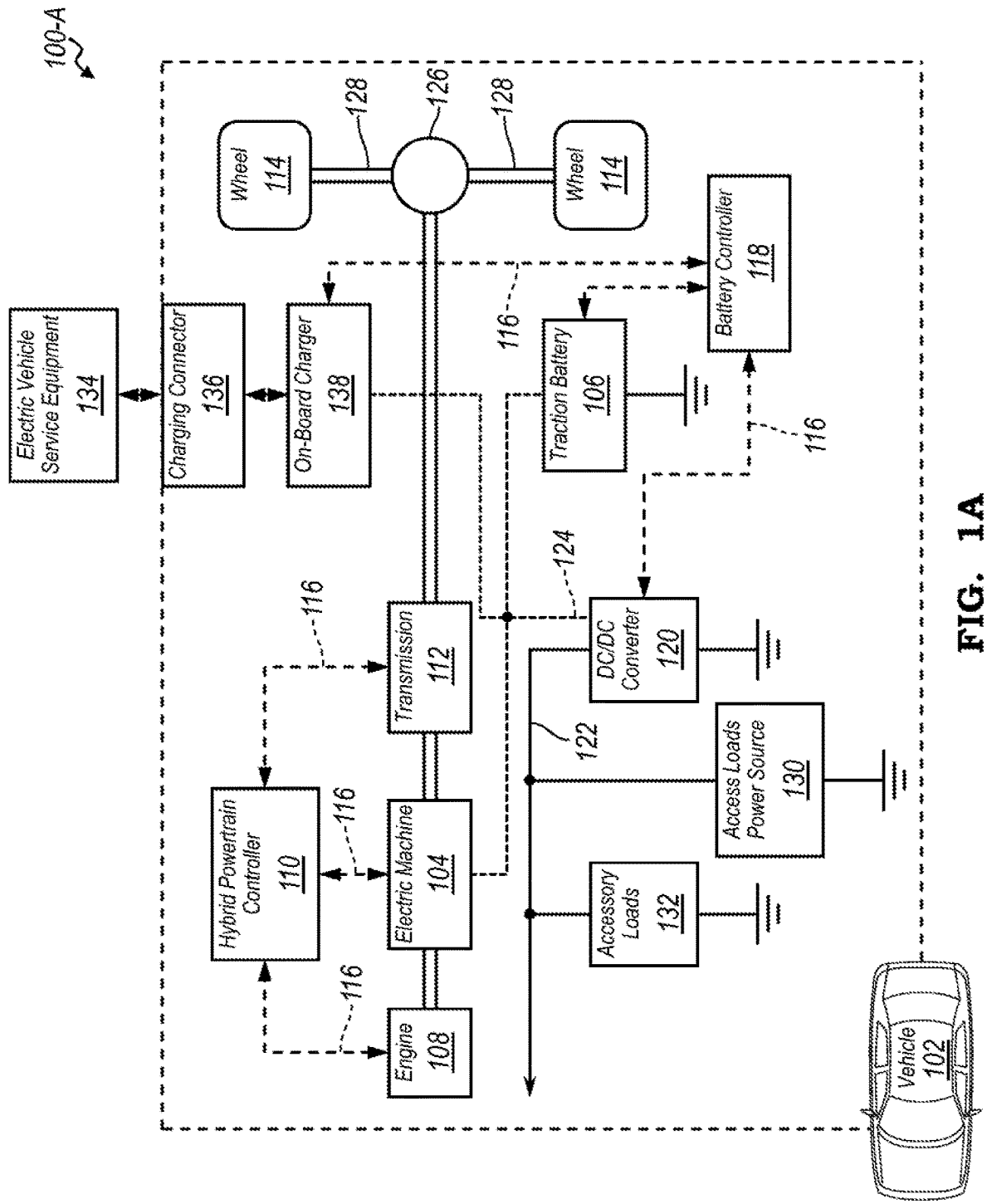
FIG. 1A is a block diagram of a hybrid electric vehicle (HEV) illustrating a typical drivetrain and energy storage components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Some off-road vehicles may be equipped with a winch. The winch may be a device including one or more components, such as, motor, gear train, cable, hook, and so on. In one example, at least a portion of the cable of the winch may be secured to, and wound around, a horizontal drum at a first cable end. The cable may be selectively unwound, loosened, or otherwise extended, at a second cable end, to be secured to or about an object or device at a point of attachment to anchor the vehicle thereto. At least a portion of the loose or extended portion of the cable may then be wound onto the drum, e.g., as a result of a corresponding rotating motion of the drum, to change or maintain relative position of the vehicle and the point of attachment with respect to one another.

In some instances, the winch may be powered by a low-voltage (e.g., 12 volts) power system of vehicle operated at or near the system maximum output power rating. For example, to move the vehicle over an obstacle using a winch, the low voltage system may need to be operated at hundreds of amps, which may affect its operation.

A winch system may be both large and heavy and may occupy a large space at the front of the vehicle, thereby, affecting safety, drivability, handling, and other operating dynamics of the vehicle, Winches may be operated at the discretion of the user with or without vehicle power. In some instances, a vehicle winch may be powered by a high voltage traction battery of the vehicle, such that requests for a change in traction may be moderated while providing sufficient power to move the vehicle over and around obstacles.

A hybrid electric vehicle (HEV) may include one or more propulsion energy sources configured to support large electrical loads while assisting with, or wholly providing, vehicle propulsion. In one example, the winch may be powered using energy of a high voltage traction battery such that a maximum tractive effort may be supported. Further, a winch controller may be configured to use energy of the traction battery to control torque demand at the winch motor.

Once the vehicle is anchored to an object via the winch cable, the winch controller may use energy of the traction battery system and/or electrified powertrain motor to operate the winch motor to provide the requested motor torque and cable tension. In some instances, the vehicle may include a chassis system configured to adjust ride height (air suspension) and dynamics (dampeners and height sensors) to modify approach angle of the vehicle with respect to the obstacle.

For example, powering the winch motor using energy of the hybrid electric motor may provide greater control of the winch motor while maintaining an operating speed of the electric motor at a relatively low value. Additionally or alternatively, the vehicle may be equipped with a traction control system configured to control vehicle slip and tractive capabilities and a chassis system configured to control ride height to increase vehicle clearance and improve suspension dynamics and geometry with respect to the obstacle.

Integration of the winch system into a control system of the vehicle may include manufacturer design packaging space and design intent for consistent vehicle operator experience, greater traction and a reduced torque application while the vehicle is traversing obstacles, utilization of motor control to regulate energy from the battery and keep consistent controlled torque on winch cable, utilization of chassis ride height and vehicle suspension dynamics to leverage greater traction, a built-in user interface in accordance with manufacturer design that allows vehicle user to leverage manufacturer-installed vehicle systems to operate the winch system.

FIG. 1 illustrates an example power distribution system 100 for a hybrid electric vehicle (hereinafter, vehicle) 102. The vehicle 102 includes one or more electric machines 104 capable of operating as one or both of an electric motor and generator, a traction battery 106, an engine 108, and a multiple-ratio automatic transmission 112. The vehicle 102 further includes a hybrid powertrain controller (hereinafter, the powertrain controller) 110 configured to monitor and control. 116 operation of one or more components of the vehicle 102, such as, but not limited to, the engine 108 and the transmission 112.

The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential 126 via a corresponding output shaft and drive wheels 114 are connected to the differential 126 through respective axles 128. The driving force applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. In some instances, the traction battery 106 may comprise a plurality of battery cells (not illustrated), e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

A battery controller 118 may be configured to monitor and control operation of the traction battery 106. In one example, the battery controller 118 configured to control the plurality of connectors and switches, e.g., contactors, of the traction battery 106. In such an example, the battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command one or more contactors to open or close in response to receiving a signal from the other vehicle controllers. Additionally or alternatively, the battery controller 118 may be in communication with the powertrain controller 110 and may command to charge and discharge the traction battery 106 responsive to one or more signals from the powertrain controller 110. In some examples, the powertrain controller 110, the battery controller 118, and other vehicle controllers may communicate with one another and with other components of the vehicle 102 via one or more in-vehicle networks, such as, but not limited to, one or more of a vehicle controller area network (CAN), an Ethernet network, and a media-oriented system transfer (MOST), as some examples.

The battery controller 118 may be further configured to receive signals from a plurality of vehicle 102 sensors (not illustrated), such as, but not limited to, battery voltage sensor, battery current sensor, battery temperature sensor, ambient temperature sensor, and so on. The battery controller 118 may command to transfer energy to and from the traction battery 106 responsive to receiving a signal from the one or more vehicle sensors. While the traction battery 106 is described as including electrochemical cells, other types of energy storage device implementations, such as capacitors, are also contemplated.

The vehicle 102 may be configured to recharge the traction battery 106 via a connection to a power grid. The vehicle 102 may, for example, cooperate with electric vehicle supply equipment (EVSE) 134 of a charging station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to, single- or three-phase AC power and DC power. The vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, international Organization for Standardization (ISO) 15118-1, 15118-2, 15118-3, the German DIN Specification 70121, the Chinese GB/T 27930, GB/T 18487.1, GB/T 20234.1, GB/T 20234.2, GB/T 20234.3 and so on. In one example, the recesses of the charging connector 136 may include a plurality of terminals, such that first and second terminals may be configured to transfer power using Levels 1 and 2 AC charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate transfer of energy to the vehicle 102 responsive to receiving a corresponding signal from the EVSE 134. In one example, the charger 138 may be configured to initiate charging responsive to a duty cycle of the request signal being greater than a predefined threshold.

The traction battery 106 is electrically connected 124 to the electric machine 104, such that energy stored in the traction battery 106 can be used and/or replenished by the electric machine 104. The connection (illustrated generally as a dotted line) 124 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106. In addition to providing energy for propulsion, the traction battery 106 may provide energy for other vehicle electrical components, such as one or more compressors and electric heaters, that operate using voltages greater than 50V.

The traction battery 106 may be configured to provide energy to a low voltage DC supply that is compatible with other electrical loads of the vehicle 102. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may connect to components requiring operating voltage that is greater than operating voltage associated with components connected to the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the powertrain controller 110. In some instances, the low voltage subsystems or components electrically connected with one another and with other portions of the vehicle 102 electrical distribution network via the low voltage connection 122 may be generally referred to as a low voltage bus.

The low voltage bus may be an electrical bus connecting together one or more low voltage connection 122 components, such as, but not limited to, an accessory loads power source 130 and accessory loads 132. The accessory loads power source 130 connected to the low voltage connection 122 may be configured to provide energy to the accessory loads 132, such as, but not limited to, cabin and propulsion system climate control, cabin lighting, vehicle audio system, and so on. Other examples of powering the accessory loads 132 may be powering one or more electrical loads of the vehicle 102 during ignition off and/or engine off states.

Figure 1B:
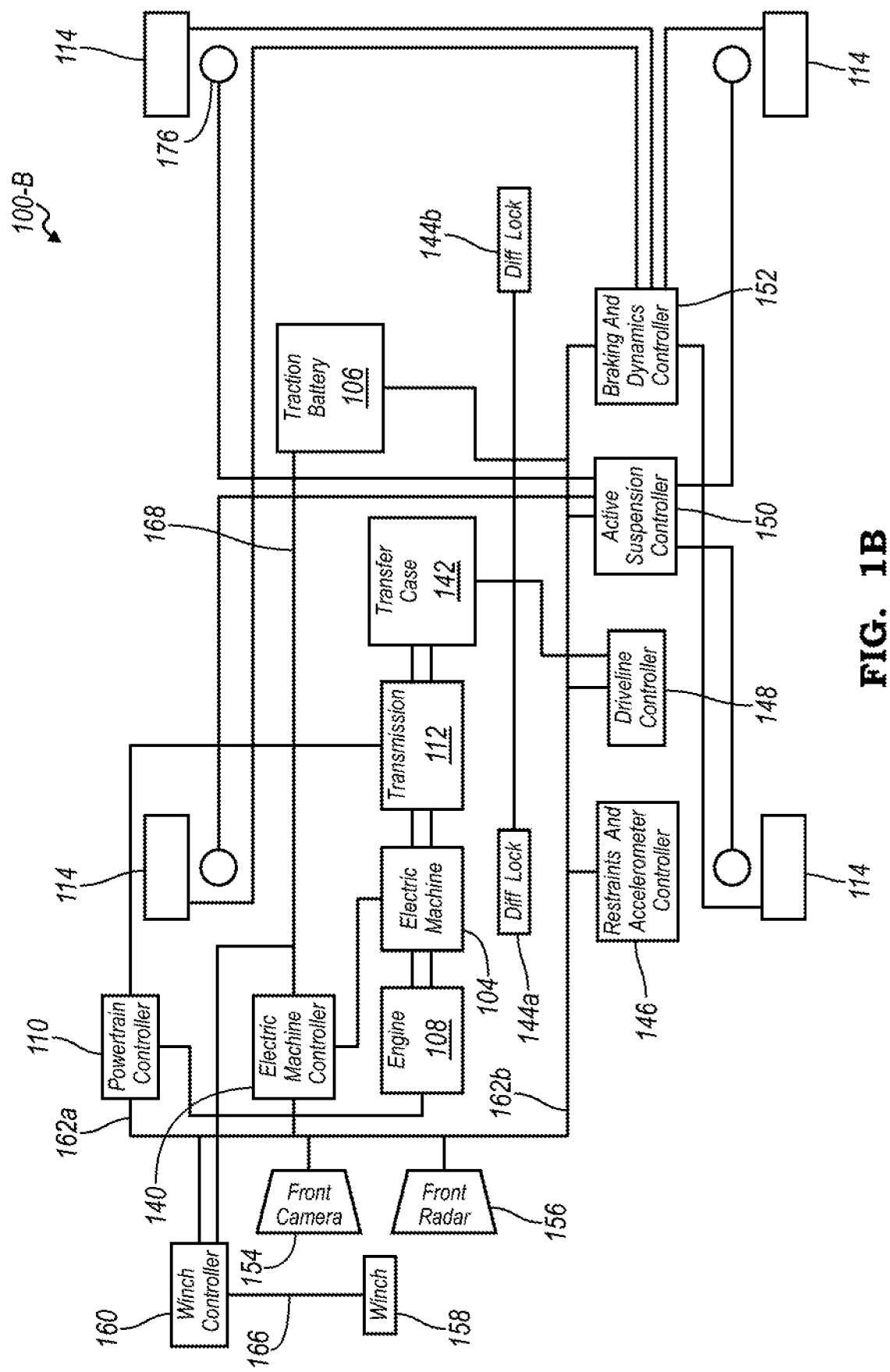
FIG. 1B is a block diagram illustrating a high voltage winch system operated using architecture of the HEV.

FIG. 1B illustrates an example power distribution system 100-B for operating a high voltage winch (hereinafter, winch) 158 of the vehicle 102. A winch controller 160 may monitor and control operation of the winch 158 using a connection 166. In one example, the winch controller 160 may be configured to activate and deactivate the winch 158 by initiating and interrupting a flow of power to the winch 158, respectively. In some instances, the winch controller 160 may be configured to initiate or interrupt a flow of power from the traction battery 106 to activate and deactivate the winch 158, respectively. In another example, the winch controller 160 may activate and deactivate the winch 158 using the traction battery 106 power in response to one or more signals or commands. To complete these and other operations of the winch 158, the winch controller 160 may include one or more processors connected with both a memory and a computer-readable storage medium and configured to perform instructions, commands, and other routines in support of the processes described herein.

For instance, the winch controller 160 may be configured to execute instructions of vehicle applications to provide features, such as, but not limited to, winch 158 activation, winch 158 deactivation, varying winch 158 operating speed, torque, cable tension, and so on. Such instructions and other data may be maintained in a non-volatile manner using a variety of types of computer-readable storage medium of the winch controller 160. An example of the computer-readable medium (also referred to as a processor-readable medium or storage) includes any non-transitory (e.g., tangible) medium that participates in providing instructions or other data that may be read by the processor of the winch controller 160. Computer-executable instructions may be compiled or interpreted from computer programs created using a variety of programming languages and/or technologies including, without limitation and either alone or in combination, Java, C, C++, C #, Objective C, Fortran, Pascal, Java Script, Python, Perl, and PL/SQL.

In one example, the processor of the winch controller 160 may be configured to calculate a position, weight, composition, and other characteristics of the object to which the winch 158 is secured. The processor of the winch controller 160 may also be configured to detect values of, and a difference between, requested and current cable speed, cable tension, motor torque, and other operating parameters of one or more components of the winch 158. In still other examples, the processor of the winch controller 160 may be configured to, in response to a predefined signal or command, vary cable speed, cable tension, motor torque and other operating parameters of one or more components of the winch 158. In some instances, the winch controller 160 may be configured to activate, deactivate, or vary operation of the winch 158 in response to signals from vehicle 102 controllers and/or corresponding user input. Specifically, the winch controller 160 may be in communication with the traction battery 106, e.g., via the battery controller 118, and may initiate the flow of power from the traction battery 106 to the winch 158, in response to one or more signals from the battery controller 118, such that the winch 158 may be used to selectively anchor the vehicle 102.

The winch controller 160 may be further configured to communicate with other components of the vehicle 102 via one or more in-vehicle networks 162. For example, the winch controller 160 may communicate with a first set of vehicle systems, subsystems, or components over a first in-vehicle network 162a, and with a second set of vehicle 102 systems, subsystems, or components over a second in vehicle network 162b. In other examples, the winch controller 160 may be connected to more or fewer in-vehicle networks 162. Additionally or alternately, one or more vehicle 102 systems, subsystem, or components may be connected the winch controller 160 via different in-vehicle networks 162 than shown, or directly, e.g., without connection to an in-vehicle network 162.

The winch controller 160 may be connected to and/or in communication with one or more vehicle 102 controllers, including, but not limited to, the powertrain controller 110, an electric machine controller 140, a restraints and accelerometer controller 146, a driveline controller 148, an active suspension controller 150, and a braking and dynamics controller 152. The powertrain controller 110 and the electric machine controller 140 that monitor and control operation of the electric machine 104, the engine 108, and the transmission 112 may receive, from a plurality of sensors (not illustrated), signals indicative of current engine and motor rotational speed, current operating and coolant temperature, power, current, voltage, flux, torque, vibration, duty cycle, and specific fuel consumption, as well as, misalignment of motor winding, and so on.

Examples of the motor, engine, and transmission sensors include thermocouples, resistance temperature detectors, and hall effect sensors, such as, but not limited to, an air-fuel ratio sensor that monitors and reports air-fuel ratio of the engine 108, an engine speed sensor that monitors and reports engine speed, a throttle position sensor that monitors and report position of an engine throttle, a crank position sensor that monitors and reports a top dead center (TDC) position of engine pistons, a cam position sensor that monitors and reports position of engine valves, a knock sensor and detects engine knock due to timing advance, an engine coolant temperature sensor that measures the engine temperature, a manifold absolute pressure (MAP) sensor that regulates fuel metering, a mass air flow (MAF) sensor that monitors and reports the mass of air entering the engine 108, an oxygen sensor that monitors the amount of oxygen in the exhaust, a fuel pressure sensor that measures pressure in the fuel system, a wheel speed sensor that measures and reports the speed of the vehicle 102, and an accelerometer that measures and reports frequency spectrum of electric machine 104 vibrations.

The restraints and accelerometer controller 146 may be configured to monitor and control operation of electrical or electromechanical system for vehicle crash sensing and airbag deployment. The driveline controller 148 may be configured to monitor and control operation of a transfer case 142 that powers multiple vehicle axles and monitor and control operation of differential locks 144a, 144b that control operation of front and rear differentials, e.g., the differential 126. The active suspension controller 150 may be configured to monitor and control torque distribution, traction, turning maneuvers, pitch, roll, suspension damping, and other movement of each wheel 114 relative to the chassis of the vehicle 102. The active suspension controller 150 may monitor and control vehicle suspension system using one or more hydraulic or pneumatic systems 176, in-wheel suspension motors, in-wheel traction motors, and other devices. The braking and dynamics controller 152 may be configured to monitor and control anti-lock braking system (ABS), dynamic rear proportioning, (DRP) system, traction control system (TCS), electronic stability control (ESC) system, and other dynamic response systems of the vehicle 102.

From the received sensor signals, each of the powertrain and electric machine controllers 110, 140, the restraints and accelerometer controller 146, the driveline controller 148, the active suspension controller 150, and the braking and dynamics controller 152 may determine other vehicle 102 operating parameters and may transmit the determined parameters and/or raw or filtered sensor data to the winch controller 160. From the detected and received sensor signals, the winch controller 160 may determine a position, weight, composition, and other characteristics of the object to which the winch 158 is secured. The winch controller 160, from the detected or received sensor signals, may determine values of, and a difference between, requested and current cable speed, cable tension, motor torque, and other operating parameters of one or more components of the winch 158. In still other examples, based on the detected or received sensor signals the winch controller 160 may vary cable speed, cable tension, motor torque and other operating parameters of one or more components of the winch 158. In some instances, the winch controller 160 may be configured to, in response to detected or received sensor parameter values being greater than or less than corresponding thresholds, activate, deactivate, or vary operation of the winch 158 in response to signals from vehicle 102 controllers and/or corresponding user input.

In some instances, the winch controller 160 may be configured to send a signal to the active suspension controller 150 indicative of a request to change, such as by raising or lowering, a position of the vehicle 102 suspension with respect to the ground. The request to change suspension position, e.g., make a ride-height adjustment, may be such that efficiency of the winch 158 motor may be greater than a predefined threshold. Additionally or alternatively, the winch controller 160 may issue the request to change suspension position, e.g., make a ride-height adjustment, to alter approach angle between the vehicle 102 and the presented obstacle. The efficiency of the winch 158 motor may be determined based on one or more operating parameters of the winch 158 and the vehicle 102, such as, but not limited to, work, W performed by the winch 158 motor with respect to a change in position of the vehicle 102 relative the point of attachment of the winch 158 hook and so on. In some other examples, the efficiency of the winch 158 motor may be determined to drive toward zero resistive forces between the vehicle 102 and the presented obstacle.

In some instances, to ensure minimal resistive forces, the winch controller 160 and/or the active suspension controller 150 may be configured to monitor forward acceleration or speed to determine and may change suspension position, e.g., make a ride-height adjustment, responsive to one of forward acceleration and speed being less than a corresponding threshold. Said another way, if the winch controller 160 issues a command to the winch motor to apply a maximum torque and forward momentum is not being achieved, then the winch controller 160 may request a lower or higher ride-height on one or more corners of the vehicle 102 based on data received from a camera 154, a radar 156, and/or supplemental data communicated from other vehicle 102 controllers. Furthermore, the winch controller 160 may continuously or periodically request a change in suspension position, such that the ride height could vary as needed.

The winch controller 160 may be configured to detect a stall condition of the vehicle 102. For example, the winch controller 160 may be configured to determine displacement, d of the winch 158 cable to determine a length of the winch 158 cable currently extended or remains to be retracted and/or the length of the winch 158 cable currently retracted or remains to be extended. Responsive to forward acceleration or speed during application of a maximum torque being less than a corresponding threshold, the winch controller 160 may issue an alert notification indicating that a stall condition has been detected.

FIG. 2A illustrates an example process 200-A for operating the winch 158 by leveraging electrical architecture of the vehicle 102. The process 200-A may begin at block 202 where the winch controller 160 may receive a request to activate the winch. 158, such as responsive to a corresponding user input, one or more commands from the vehicle 102 controllers 110, 140, 146, 148, 150, or 152 indicating a request to operate the winch 158, and so on. At block 204, the winch controller 160 may determine whether a requested winch 158 torque is greater than a torque threshold. In one example, the winch controller 160 may be configured to receive requested torque values from the driveline controller 148, the active suspension controller 150, and/or the braking and dynamics controller 152. While the controllers 148, 150, and 152 are indicated as providing the torque values, other signals from one or more other vehicle controllers are also contemplated.

At block 206, the winch controller 160 may issue an alert notification indicating that the requested torque is greater than torque available to be provided by the traction battery 106 responsive to the requested torque being greater than a torque threshold. The winch controller 160 may then prevent initiating flow of power from the traction battery 106 to the winch 158 to operate the winch 158. The winch controller 160 may then exit the process 200-A.

Responsive to the requested torque being less than a torque threshold, the winch controller 160 may, at block 208, determine whether SOC of the traction battery 106 (hereinafter, battery SOC) is greater than an SOC threshold. At block 206, the winch controller 160 may issue an alert notification indicating that available battery SOC is insufficient to provide requested torque responsive to the battery SOC being less than an SOC threshold. Additionally or alternatively, the winch controller 160 may prevent initiating flow of power from the traction battery 106 to the winch 158 to operate the winch 158. The winch controller 160 may then exit the process 200-A.

Responsive to the battery SOC being greater than an SOC threshold, the winch controller 160, at block 220, may initiate flow of power from the traction battery 106 to the winch 158 to operate the winch 158. In one example, the winch controller 160 may use power of the traction battery 106 to operate the winch 158 to deliver the requested torque and/or cable tension. The process 200-A may then end.

FIG. 2B illustrates an example process 200-B for operating the winch 158 by leveraging hybrid electric vehicle 102 architecture. The process 200-B may begin at block 212 where the winch controller 160 may receive a request to activate the winch 158. Such as responsive to a corresponding user input, one or more commands from the vehicle 102 controllers 110, 140, 146, 148, 150, or 152 indicating a request to operate the winch 158, and so on. At block 214, the winch controller 160 may determine whether a requested winch 158 torque is greater than a torque threshold. In one example, the winch controller 160 may be configured to receive requested torque values from the driveline controller 148, the active suspension controller 150, and/or the braking and dynamics controller 152. While the controllers 148, 150, and 152 are indicated as providing the torque values, other signals from one or more other vehicle controllers are also contemplated.

Responsive to the requested torque being less than a torque threshold, the winch controller 160, at block 216, may initiate flow of power from the accessory loads power source 130 to the winch 158 to operate the winch 158. In one example, the winch controller 160 may use power of the accessory loads power source 130 to operate the winch 158 to deliver the requested torque and/or cable tension. The process 200-B may then end.

Responsive to the requested torque being greater than a torque threshold, the winch controller 160, at block 218, may determine whether SOC of the traction battery 106 (hereinafter, battery SOC) is greater than an SOC threshold. The winch controller 160 may, at block 216, may initiate flow of power from the accessory loads power source 130 to the winch 158 to operate the winch 158 if the battery SOC is less than an SOC threshold. The process 200-B may then end.

Responsive to the battery SOC being greater than an SOC threshold, the winch controller 160, at block 220, may initiate flow of power from the traction battery 106 to the winch 158 to operate the winch 158. In one example, the winch controller 160 may use power of the traction battery 106 to operate the winch 158 to deliver the requested torque and/or cable tension. The process 200-B may then end.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable particular applications.

What is claimed is:

1. A vehicle comprising:
an auxiliary battery configured to power an electrical accessory;
a traction battery configured to provide power to propel the vehicle;
a winch including a motor and cable; and
a controller configured to, responsive to a requested torque of the motor being less than a threshold, initiate transfer of power to the motor from the auxiliary battery, and initiate transfer of power to the motor from the traction battery if the auxiliary battery is not powering the motor.

2. The system of claim 1, wherein the controller is further configured to operate a suspension of the vehicle to change height of the vehicle with respect to ground during the transfer of power in response to efficiency of the motor falling below an efficiency threshold.

3. The system of claim 2, wherein the efficiency is based on speed of the vehicle, acceleration of the vehicle, or work performed by the motor.

4. The system of claim 1, wherein the controller is further configured to transfer of power to the motor from the auxiliary battery in response to an air bag state being OFF, a transfer case state being four-wheel drive or all-wheel drive, an active suspension system state being ENABLED, or a braking system state being APPLIED.

5. A system for a vehicle comprising:
a winch including a motor and cable;
a traction battery; and
a controller configured to,
in response to a requested torque for the motor being less than a first threshold, initiate transfer of power from the traction battery to the motor to provide the requested torque, and
in response to a torque efficiency of the motor falling below an efficiency threshold, operate a suspension of the vehicle to change height of the vehicle with respect to ground during the transfer of power.

6. The system of claim 5, wherein the initiating is further in response to the requested torque being greater than a second threshold less than the first threshold.

7. The system of claim 6 further comprising an auxiliary battery, wherein the controller is configured to initiate transfer of power from the auxiliary battery to provide the requested torque in response to the requested torque being less than the second threshold.

8. The system of claim 5, wherein the efficiency is based on speed of the vehicle, acceleration of the vehicle, or work performed by the motor.

9. The system of claim 5, wherein the controller is further configured to transfer of power to the motor from the auxiliary battery in response to an air bag state being OFF, a transfer case state being in four-wheel drive or all-wheel drive, an active suspension system state being ENABLED, or a braking system state being APPLIED.

10. A method for a vehicle comprising:
initiating, by a controller, transfer of power from a traction battery to a motor of a winch to deliver a requested motor torque responsive to the requested torque being less than a first threshold; and
operating a suspension of the vehicle to change height of the vehicle with respect to ground during the transfer of power responsive to a torque efficiency of the motor falling below an efficiency threshold.

11. The method of claim 10, wherein the initiating is further in response to the requested torque being greater than a second threshold less than the first threshold.

12. The method of claim 11 further comprising initiating transfer of power from an auxiliary battery to provide the requested torque responsive to the requested torque being less than the second threshold.

13. The method of claim 11, wherein the controller is further configured to transfer of power to the motor from the auxiliary battery in response to an air bag state being OFF, a transfer case state being four-wheel drive or all-wheel drive, an active suspension system state being ENABLED, or a braking system state being APPLIED.

14. The method of claim 10, wherein the efficiency is based on speed of the vehicle, acceleration of the vehicle, or work performed by the motor.

\* \* \* \* \*